H. D. PRATT.
ICE SAWING MACHINE.
APPLICATION FILED SEPT. 24, 1914.
1,225,488.
Patented May 8, 1917.
3 SHEETS—SHEET 2.
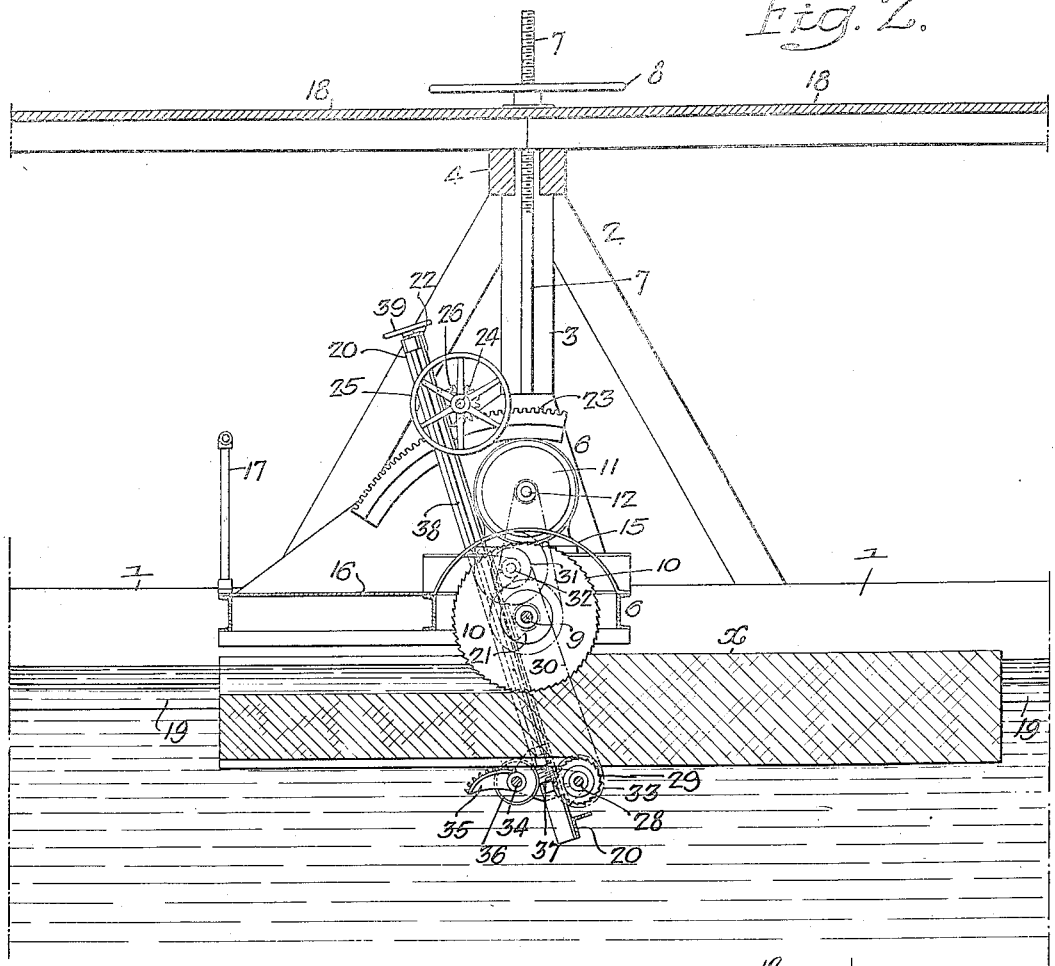
Fig. 2.
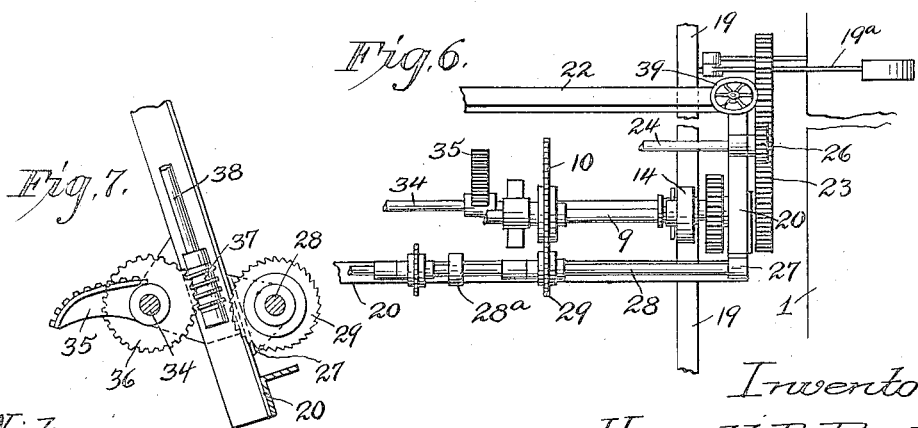
Fig. 6.
Fig. 7.
Witnesses
Willet Burrowes
Charles H. York
Inventor
Howell D. Pratt
by his Attorneys
Hmm & Howm H. D. PRATT.
ICE SAWING MACHINE.
APPLICATION FILED SEPT. 24, 1914.
1,225,488.
Patented May 8, 1917.
3 SHEETS—SHEET 3.
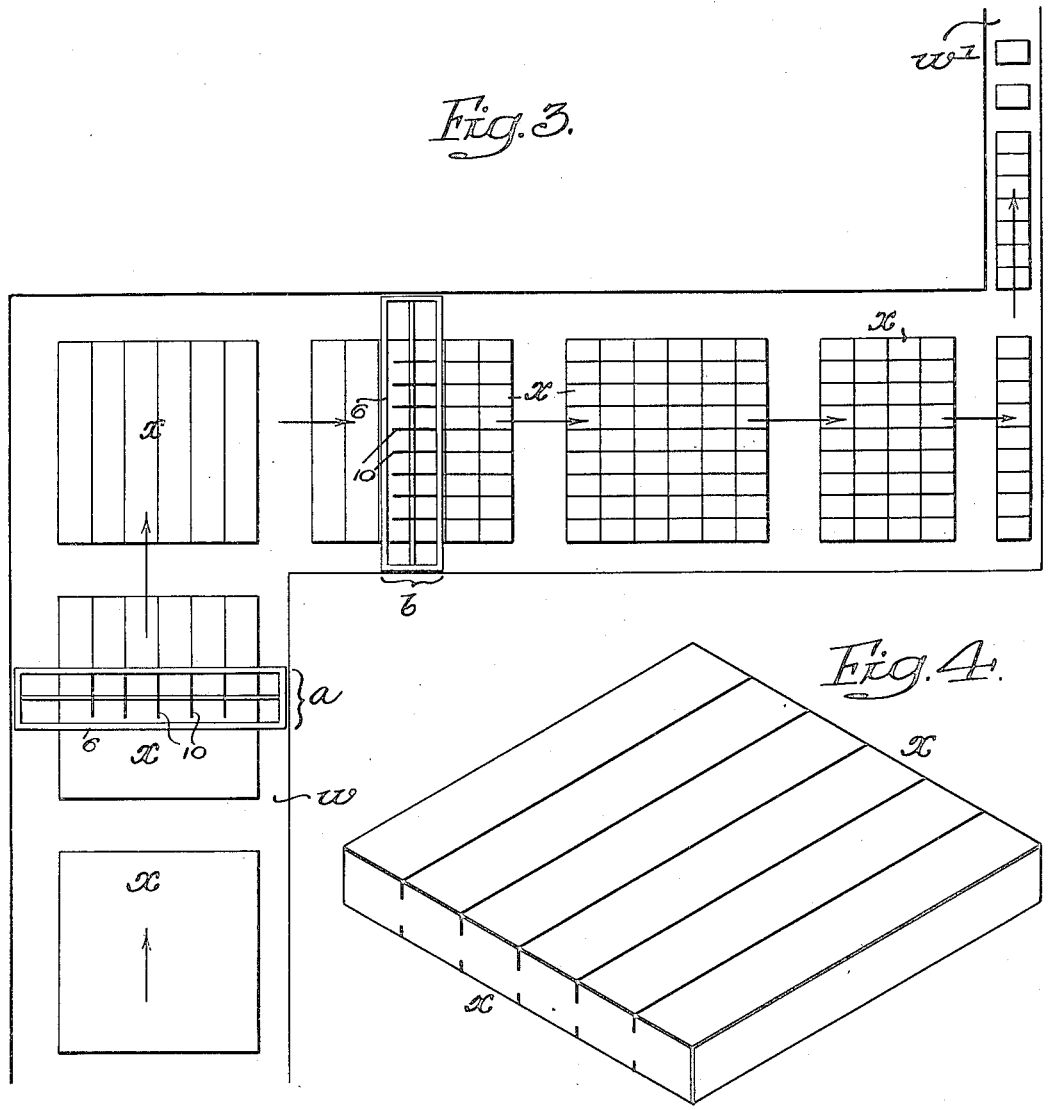
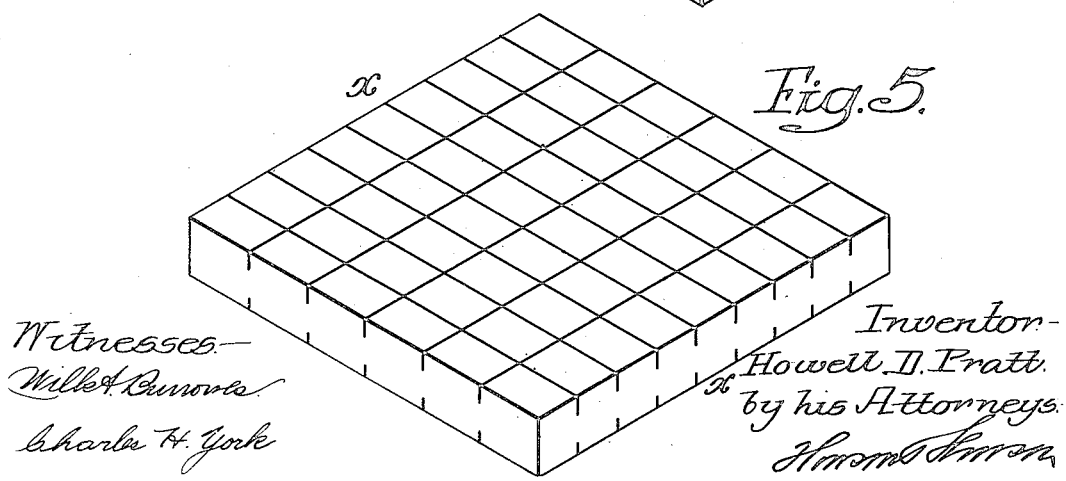
Witnesses
Inventor
Howell D. Pratt
by his Attorneys

UNITED STATES PATENT OFFICE.

HOWELL D. PRATT, OF PHILADELPHIA, PENNSYLVANIA, ASSIGNOR TO LINK-BELT COMPANY, OF CHICAGO, ILLINOIS, A CORPORATION OF ILLINOIS.

ICE-SAWING MACHINE.

1,225,488.   Specification of Letters Patent.   Patented May 8, 1917.

Application filed September 24, 1914. Serial No. 863,351.

*To all whom it may concern:*

Be it known that I, HOWELL D. PRATT, a citizen of the United States, residing in Philadelphia, Pennsylvania, have invented certain Improvements in Ice-Sawing Machines, of which the following is a specification.

One object of my invention is to provide a power driven apparatus for cutting ice into cakes of a proper size to be packed in a storage house, or in cars or other carriers.

A further object of the invention is to provide means for cutting a groove in the under side of the ice in line with the kerf in the upper surface of the ice so that it can be more readily severed without uneven breakage.

These objects I attain in the following manner reference being had to the accompanying drawings, in which:

Fig. 2 is a transverse sectional view on the line $a$—$a$, Fig. 1;

Fig. 3 is a diagrammatic plan view, showing an ice channel and the location of two of the ice sawing devices, one arranged at an angle to the other for cutting ice into small blocks;

Figs. 4 and 5 are perspective views, showing the two steps in cutting a large block of ice into small blocks;

Fig. 6 is a plan view of part of the apparatus, and

Fig. 7 is an enlarged view showing the adjusting means for the lower saws.

Figure 1:
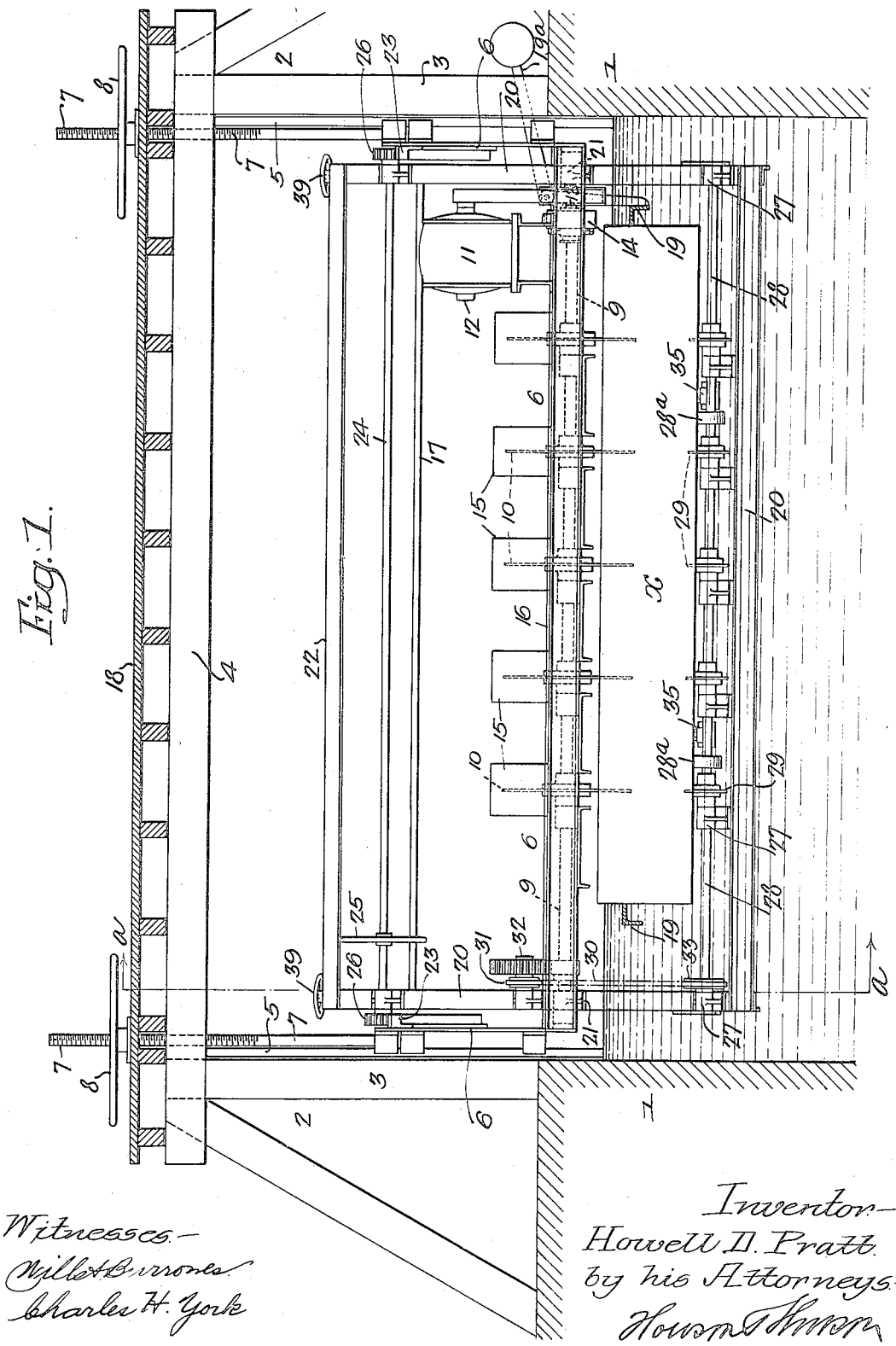
Figure 1 is a front elevation of my improved ice cutting machine.

My invention relates to a type of ice harvesting apparatus which consists of a gang of saws which cut an ice block, that has been previously cut from the field, into a number of smaller sections. These sections can be cut by another saw so as to form blocks of the proper size to be stored in a storage house or in cars.

A channel is formed at the point where the gang of saws is to be located and a suitable foundation 1 made of concrete or logs is built, and upon this foundation is erected a frame 2 consisting of uprights 3 and a cross member 4, suitably braced. On the vertical members 3 of the frame are guides 5 for the main saw frame 6, and screws 7 at each side are attached at their lower ends to this main saw frame 6 and passing through the cross frame 4 and on these screws are handled nuts 8 so that, on turning the nuts, the screws, with the frame 6, can be raised and lowered in order to adjust the frame in respect to the ice block, which is indicated at $x$, Fig. 1.

Mounted in suitable bearings on the frame 6 is a saw spindle 9 made of a series of sections or in a single piece and on this spindle is a series of saws 10 which may, in some instances, be adjusted thereon according to the block of ice to be cut.

11 is an electric or other motor, the shaft 12 of which is belted to a wheel on a shaft 13 coupled to the saw spindle by a clutch 14 so that on moving the clutch into and out of position the saw spindle can be driven or disconnected at will. Over the portion of the saw projecting above the frame 6 is a guard 15 so as to protect the workmen and to prevent splashing. In front of the saws is a platform or foot walk 16 having a rail 17 at one side in the present instance. I preferably provide a roof 18, which is supported by the beam 4, although this may be dispensed with in some instances.

The several saws 10 each cut a kerf of any depth desired in the upper surface of a large block of ice which is presented to the saws. The block is cut to a given dimension so as to fit between guides 19 carried on the frame 6. One of these guides is fixed and the other is carried by weighted arms $19^a$ so as to accommodate blocks varying slightly in width. The weight will keep the block against the fixed guide 19 while it passes under the saw frame so that the kerfs are accurately cut in the blocks.

In order to properly store the ice in houses, the blocks of ice must be of a given size and the corners must be substantially square so that one block can be packed close to another in order that the ice may be in suitable form to be removed from the storage house when required.

Heretofore, great care had to be exercised in breaking the strips of ice from the large blocks and in breaking the strips into smaller blocks for storage, as all uneven blocks of ice were discarded as unfit for use. I have found that by scoring the underside of a cake of ice in line with the saw kerf in the upper surface thereof, that there is very little waste, as the ice will break at the proper place on the scored lines.

I preferably mount on the saw frame a supplemental frame 20 which, in the present instance, is pivoted in line with the main saw spindle 9. On the frame 20 are pivot boxes 21, one at each end, which encircle the spindle or an extension thereof. The frame is connected at the upper end by a bar 22. Secured to each side of the frame 6 is a segment 23 and on the frame 20 is a transverse shaft 24 having a hand wheel 25. At each end of the shaft is a gear wheel 26 which meshes with the teeth of the segmental rack 23 so that on turning the hand wheel 25, the frame 20 can be set at any angle desired. At the lower end of the frame are bearings 27 for a saw spindle 28 on which is a series of saws 29. These saws are adjustable on the spindle so that they will aline with the saws 10 on the main saw spindle 9. The saw spindle 28 is driven from the main saw spindle 9 through gearing and a chain 30 which passes around a sprocket wheel 31 on the shaft 32, which is geared to the spindle 9 and around a sprocket wheel 33 on the spindle 28. By this gearing the lower spindle is driven at a less speed than the main spindle. By pivoting the frame 20 the lower saws 29 can be adjusted to accommodate blocks of different thicknesses, as clearly shown in Fig. 2. All that is necessary is to cut a small kerf on the under side of the ice as the break will usually follow the kerf.

Mounted in bearings at the lower end of the pivoted frame 20 is a shaft 34 on which are two toothed retarders 35 in the present instance. These retarders are in the form of cams and secured to one end of the shaft is a worm wheel 36 with which meshes a worm 37 on a shaft 38 leading to the upper end of the frame 20, and on this shaft is a hand wheel 39 by which it is turned, so that, on turning the shaft, the retarders can be brought into or out of contact with the under side of a block of ice.

The tendency of the saws is to drag the ice through the apparatus and the retarders are used to place sufficient friction on the ice so that there will be a relative motion between the ice and the saws so that they will cut as well as feed. Thus the saws will not feed the ice too rapidly and choke the apparatus.

On the lower saw spindle 28 are two gages 28ª, which limit the depth of the cut of the lower gang of saws. These gages are in the form of circular disks, which are attached to the spindle.

Referring to Figs. 3, 4, and 5, a channel $w$ is formed at one end of an ice pond or lake and this channel is in the form of an L with a narrow outlet $w^1$ at one end for a small block of ice. The two saw frames are placed at right angles to each other as indicated at $a$ and $b$ and after the block of ice $x$ has been cut to the proper size from a field of ice, it is passed into the channel and moves under the first gang of saws $a$. These saws feed the block forward and also cut a kerf of the proper depth in the face, as indicated in Fig. 5, and the small saws under the water preferably cut a shallower series of kerfs in the under side of the block of ice in line with the upper series of kerfs, the retarders being so adjusted as to prevent the too rapid feeding of the ice past the saws. The block, after passing the saws $a$, is then moved in a direction at right angles to its former movement, and passes the saws of the frame $b$. One gang of saws cuts a series of kerfs in the upper surface and the other gang cuts a series of kerfs in the under side of the block of ice, the kerfs being at right angles to the series of kerfs previously cut so that when a block of ice has passed the saws $b$, it is cut as illustrated in Fig. 5, and can be readily broken by any suitable means into small blocks to be fed through the channel $w^1$ to the storage house or cars.

I claim:

1. The combination in apparatus for sawing ice, of a channel having water therein and through which the ice has to be passed; a fixed frame spanning the channel; a vertically adjustable saw frame mounted on the fixed frame and extending under the surface of the water in the channel; a gang of saws on the saw frame; means for driving said saws, said saws being so arranged as to cut a series of kerfs in the bottom of a block of ice as it passes through the channel; and means for vertically adjusting the frame so as to regulate the position of the saws in respect to the under side of a block of ice.

2. The combination in apparatus for cutting floating ice, of a channel for the ice; a main frame extending across the channel above the water therein; a saw frame vertically adjustable on the main frame and extending below the surface of the water in the channel; means for adjusting said frame; a saw spindle mounted on the lower end of the said frame; a series of saws on the spindle arranged to cut a series of kerfs in the bottom of a block of ice passing through the channel; means for driving the spindle; a main saw spindle located above the water in the channel and carried by the main frame; a series of saws thereon; and means for driving the saws so that a series of kerfs will be cut in the upper side of the ice simultaneously with the cutting of the kerfs in the under side of the ice.

3. The combination in apparatus for cutting floating ice, of a channel for the ice; a main frame extending across the channel; a main saw frame mounted thereon; a saw spindle, having a series of saws, mounted on the saw frame; means for driving the spindle; a supplemental frame pivoted to the main frame and extending below the surface of the water in the channel; means for adjusting the frame on the pivot so that the frame will assume different angles; a saw spindle mounted on the lower end of the supplemental frame and located below the surface of the water in the channel; and a series of saws on the spindle in line with the upper saws and arranged to cut a series of kerfs on the under side of a block of ice passing through the channel.

4. The combination of a channel having water therein; a main frame extending across the channel; a saw spindle mounted on the said frame; a series of saws on the spindle; means for driving the spindle; a supplemental frame carried by the main frame and extending below the surface of the water in the channel; a spindle on the lower end of the supplemental frame; a series of saws on said spindle; means for driving the saws; a shaft on the lower end of the supplemental frame and having toothed retarders thereon for engaging the bottom of the ice; and means for turning the shaft so as to bring the retarders into and out of contact with the block of ice.

5. The combination of a channel having water therein; a main saw frame; a saw spindle vertically adjustable thereon; a series of saws mounted on the spindle; means for driving the spindle; a supplemental frame pivotally mounted on the main saw frame; a segment on the main saw frame of the apparatus; a hand shaft having pinions meshing with the segment; a saw spindle on the lower end of the supplemental frame below the surface of the water in the channel; a series of saws on the saw spindle for cutting a kerf in the under side of a block of ice; a shaft having a retarder consisting of a toothed cam; a shaft carried by the supplemental frame and geared to the shaft carrying the retarder so that on turning the first mentioned shaft the retarder will be moved toward or from the under side of a block of ice.

In testimony whereof, I have signed my name to this specification, in the presence of two subscribing witnesses.

HOWELL D. PRATT.

Witnesses:
  Jos. H. Klein,
  Wm. A. Barr.